(12) United States Patent
Butsch et al.

(10) Patent No.: US 7,048,658 B2
(45) Date of Patent: May 23, 2006

(54) DEVICE FOR CONVERTING A ROTATIONAL MOVEMENT INTO AN AXIAL MOVEMENT

(75) Inventors: Michael Butsch, Daisendorf (DE); Martin Brehmer, Constance (DE)

(73) Assignee: Wittenstein Motion Control GmbH, Igersheim (DE)

( * ) Notice: Subject to any disclaimer, the term of this patent is extended or adjusted under 35 U.S.C. 154(b) by 34 days.

(21) Appl. No.: 10/432,417

(22) PCT Filed: Jul. 18, 2001

(86) PCT No.: PCT/DE01/02680

§ 371 (c)(1),
(2), (4) Date: May 22, 2003

(87) PCT Pub. No.: WO02/50453

PCT Pub. Date: Jun. 27, 2002

(65) Prior Publication Data

US 2004/0116218 A1  Jun. 17, 2004

(30) Foreign Application Priority Data

Dec. 21, 2000  (DE) ............................... 100 63 772

(51) Int. Cl.
*F16H 61/32* (2006.01)
*F16H 59/37* (2006.01)
*F16H 37/00* (2006.01)

(52) U.S. Cl. .............................. 474/23; 474/8; 474/17; 475/211

(58) Field of Classification Search .................. 474/17, 474/23, 25, 31, 43, 46, 84, 8; 475/84, 93, 475/104, 107, 211; 74/339
See application file for complete search history.

(56) References Cited

U.S. PATENT DOCUMENTS 3,082,636 A * 3/1963 Steinlein ....................... 474/17
3,097,540 A * 7/1963 Berens .......................... 474/23

(Continued)

FOREIGN PATENT DOCUMENTS

DE         4302478        8/1994

(Continued)

*Primary Examiner*—Marcus Charles
(74) *Attorney, Agent, or Firm*—Collard & Roe, P.C.

(57) ABSTRACT

A device for converting a rotational movement into an axial movement includes driven planetary rollers (10) and a sliding body (5) that can be axially displaced by means of the planetary rollers (10). The planetary rollers (10) are fixed axially in a driven carrier (9), are rotationally mounted and are provided with grooves (11). The grooves (11) of these planetary rollers (10) engage in a thread-type groove of the sliding body (5). In the center of the carrier (9) a bearing body (7) is provided, which engages in the grooves (11). The grooves (11 and 12) have a mutually adapted gradient, and the planetary rollers (10) and the bearing body (7) engage with one another without slip. Also the carrier (9) and the bearing body (7) engage with one another without slip. The carrier (9) and the bearing body (7) are driven in a rotational relationship, which guarantees that no slip occurs between the planetary rollers (10) and the sliding body (5).

8 Claims, 1 Drawing Sheet

U.S. PATENT DOCUMENTS

| | | |
|---|---|---|
| 3,214,991 A | 11/1965 | Perrin |
| 3,406,584 A | 10/1968 | Roantree |
| 3,516,296 A * | 6/1970 | Detwiler .................... 474/23 |
| 3,585,869 A | 6/1971 | Lemor |
| 4,160,456 A * | 7/1979 | Hawkins et al. .............. 74/339 |
| 4,274,295 A * | 6/1981 | Grube ........................ 474/23 |
| 4,909,776 A * | 3/1990 | Sakakibara et al. ........... 474/25 |
| 5,121,019 A | 6/1992 | Pradler |
| 5,557,154 A | 9/1996 | Erhart |
| 6,000,513 A * | 12/1999 | Richards .................... 192/61 |
| 6,026,696 A | 2/2000 | Hehl |
| 6,592,486 B1 * | 7/2003 | Arbanas et al. .............. 475/84 |

FOREIGN PATENT DOCUMENTS

| | | | |
|---|---|---|---|
| DE | 19542453 | 5/1997 | |
| EP | 0285407 A2 * | 10/1988 | ................ 474/23 |
| WO | 9703308 | 1/1997 | |
| WO | 9725554 | 7/1997 | |
| WO | 0049313 | 8/2000 | |

\* cited by examiner

DEVICE FOR CONVERTING A ROTATIONAL MOVEMENT INTO AN AXIAL MOVEMENT

CROSS REFERENCE TO RELATED APPLICATIONS

Applicants claim priority under 35 U.S.C. §119 of GERMAN Application No. 100 63 772.8 filed on 21 Dec. 2000. Applicants also claim priority under 35 U.S.C. §365 of PCT/DE01/02680 filed on 18 Jul. 2001. The international application under PCT article 21(2) was not published in English.

BACKGROUND OF THE INVENTION

1. Field of the Invention

The invention relates to a device for converting a rotational movement into an axial movement in accordance with the preamble of claim 1.

2. The Prior Art

Such a device is known from WO-A-97/03308.

SUMMARY OF THE INVENTION.

The invention concerns the problem of improving this device functionally and in particular with respect to a gear totally devoid of slip with extremely high transmission precision between drive rotational movement and driven slide movement. At the same time compact construction should also be possible, which has not been available in a generic device known from U.S. Pat. No. 3,214,991. In that device the carrier and the bearing body are already driven in a rotational relationship, guaranteeing freedom from slip between the planetary rollers and the slide body. The drive shaft is arranged at considerable parallel distance from the axis of the slide body. resulting in an unwanted bulky construction.

This problem is solved by designing the generic device according to the characterising features of claim 1.

The rotational movements between the drive shaft with the bearing body, the planetary rollers engaging in the sliding body and the carrier bearing these planetary rollers, are generated with restraint by means of which a torsion-free mounted sliding body can be driven absolutely translation-precise, i.e. conformal to the rotational drive movement. The opposing toothed restraint aids in achieving the slip-free power translation between the individual parts. The generic drive mechanism is in principle a planetary transmission drive with the bearing body as a sun, and the sliding body as hollow wheel, between which the planets borne in a planetary carrier mesh.

Slip between the individual, reciprocally driven parts is excluded by the fact that slide movements between the sun and the planets are excluded by torsion-free mounting of the sliding body on the one hand, and on the other hand that the planet carrier is restricted by a rotational relationship to the bearing body guaranteeing freedom from slip.

The gradient of the shafts of the bearing body and the planets should be selected in an opposite direction, whereby depending on the diameter ratio of the grooves of bearing body and planets the groove pitch in both parts can or must be different.

The gradient of the grooves on the sliding body and the planetary rollers can be mutual or opposite. In a mutual configuration with the drive high power transmission can be generated at high speeds and minimal slide way. An opposing gradient between the grooves of the sliding body and the planetary rollers is suitable for applications where a relatively high displacement speed of the sliding body relative to high power transmission is important.

Effective configurations and applications of the device according to the present invention are subject of the subclaims.

According to the present invention two fully independent can be used for the bearing body and the carrier, as long as they work only in the required rotational relationship to one another as according to the present invention. However, it is effective to use a common drive source which drives one directly and the other one via a transmission gear via a drive shaft of both elements "bearing body and carrier". A planetary gear is particularly suitable as such a transmission gear.

Particularly advantageous is use of the device according to the present invention as adjustable drive of a width-adjustable pulley of an infinitely variably adjustable pulley gear, for vehicle transmissions in particular.

Such an adjustable drive can be designed with a hollow centre, and can thus be mounted simply directly on the pulley axis for torsion-free rotation therewith. The drive motor can be arranged as a hollow shaft in the cavity of the driveshaft, that is, in an annular space between the drive shaft or the bearing body connected thereto and the pulley shaft. The width-adjustable pulley is adjusted by the sliding body of the device according to the present invention, for which the latter is connected solidly to the pulley concerned, which can be mounted to displace longitudinally on the pulley shaft.

By way of example, injection moulding machines can be equipped in extremely advantageous fashion with an adjustable device according to the present invention.

BRIEF DESCRIPTION OF THE DRAWINGS.

A particularly effective embodiment, explained in greater detail hereinbelow, is illustrated in the diagram, in which the sole figure.

Figure 1:
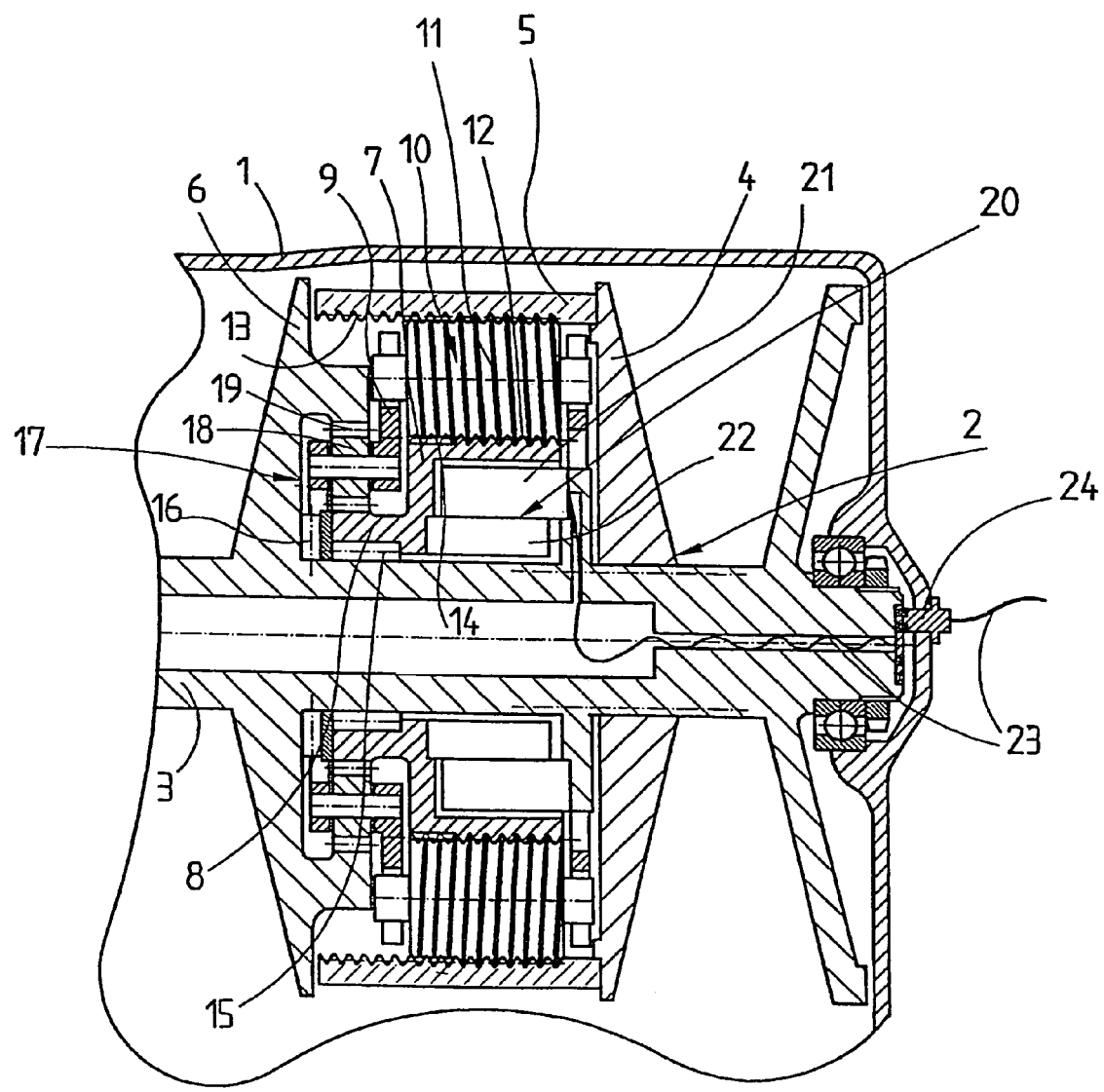
FIG. 1 illustrates a lengthwise section through a pulley-adjustable drive in an infinitely variable adjustable vehicle transmission belt transmission.

DETAILED DESCRIPTION OF PREFERRED EMBODIMENTS.

In a housing 1 a pulley 2 is rotationally mounted via a pulley shaft 3 in an infinitely variable adjustable belt transmission of a vehicle transmission. The pulley shaft 3 is a component of the vehicle motor shaft or is at least connected thereto.

The pulley 2 can be adjusted in width with respect to its space for housing the belt of the belt transmission, for which purpose it has a pulley region 4 adjustable lengthways on the pulley shaft 3. This pulley region is adjusted by a sliding body 5 of the drive mechanism according to the present invention.

The drive mechanism according to the present invention with the sliding body 5 is constructed as follows.

A drive shaft 8 connected solidly to a bearing body 7 rotates on the pulley shaft 3, rotationally mounted and supported axially against a supporting member 6 connected solidly to the pulley shaft 3 in the manner of a rolling contact bearing. Planetary rollers 10, mounted in a carrier 9, and engaging on the one hand in the bearing body 7 and on the other hand engaging in the sliding body 5 mesh between the bearing body 7 and the sliding body 5.

The bearing body 7 and the planetary rollers 10 are provided with mutually engaging grooves 11 or 12 with a mutual gradient. The grooves 11 of the planetary rollers 10 engage in grooves 13 with mutual or opposite gradient of the sliding body 5.

A mutual gradient of the grooves of sliding body 5 and planetary rollers 10 is selected for minor adjustment speeds of the sliding body at high forces to be transmitted, while an opposite gradient for fast adjustment speeds is realised at forces which are to be transmitted relatively minimally.

An intermeshing toothed region 14 aids in achieving totally secure slip-free capacity for the rotational movements, i.e. translation at a precise swing angle, between the bearing body 7 and the planetary rollers 10. In this toothed region 14 the bearing body 7 has no grooves 12, i.e. on the bearing body 7 in this region there is normal face serration. With the planetary rollers 10 the gearing 14 engages in the grooves 11 present there. The forming of the toothed region 14 in the planetary rollers 10 must occur such that its grooves 11 can engage unhindered in the grooving of the sliding body 5.

A radial bearing 15 between the drive shaft 8 and the pulley shaft 3, as well as an axial bearing 16 between the drive shaft 8 and the supporting member 6 connected solidly to the pulley shaft 3 serve to mount the drive shaft 8 with the bearing body 7 on the pulley shaft 3 and opposite the supporting member 6.

The gradient and pitch of the grooves 11 to 13 on the bearing body 7, the planetary rollers 10 and the sliding body 5 as well as the groove pitch are to be adjusted in a manner known in gearing technology for proper operation and attaining a desired transmission rotational relationship between rotary drive and slide main drive pinion in a manner known per se.

To prevent slip, i.e. deviation from an angle of rotation/setting range, between the planetary rollers 10 and the sliding body 5 an accessory drive 17 is provided for restraining the carrier 9 in a preset rotational relationship of carrier 9 and drive shaft 8 ensuring a slip-free state. This accessory drive 17 could per se have any drive source. In the present embodiment the drive shaft 8 acts as drive source for the accessory drive 17, which is designed in the form of a planetary toothed gearing with the drive shaft 8 as a sun and the carrier 9 of the planetary rollers 10 engaging with the sliding body 5 as rotation carrier for planetary toothed wheels 18 mounted in the latter, which move on rolling contact in a hollow toothed wheel 19 formed in the supporting member 6. The transmission ratio of this planetary toothed gearing is to be configured such that the carrier 9 revolves with the planetary rollers 10 engaging in the sliding body 5 at the angular speed required for slip-free, i.e. angularly precise running between the planetary rollers 10 and the sliding body 5.

An electrical hollow shaft motor 20 with a stator 21 connected solidly to the pulley shaft 3 and a rotor 22 connected solidly to the drive shaft 8 serves as drive motor for the drive shaft 8. The hollow shaft motor 20 is housed extremely compactly in an annular space between the bearing body 7 and the pulley shaft 3. The power is supplied to the hollow shaft motor 20 by way of an electrical line 23 provided inside the pulley shaft 3, which is supplied with current via a slide contact 24.

With the hollow shaft motor 20 as drive source the pulley region 4 can be moved simply by means of the sliding body 5 to adjust the width of the pulley 2.

A particular advantage of the use of the drive mechanism according to the present invention in an infinitely variably adjustable belt transmission is that the whole drive including drive source can be provided solid with the rotating pulley shaft 3. This results in particularly simple construction of the adjustable drive.

In the abovementioned application the grooves of the planetary rollers 10 and of the sliding body 5 are designed with a mutual gradient as pulley adjustment mechanism.

The invention claimed is:

1. A device for converting a rotational movement into an axial movement with driven planetary rollers (10) kept at the same distance peripherally, and with a sliding body (5) axially displaceable by the planetary rollers (10), comprising
    (a) the planetary rollers (10) are fixed axially in a rotating carrier (9) are rotationally mounted and provided with grooves (11),
    (b) the planetary rollers (10) are threadably engaged with the sliding body (5) and displaceable along the axis of the carrier (9),
    (c) the sliding body (5) is a hollow body enclosing the planetary rollers (10),
    (d) an axially attached bearing body (7) rotating about its axis, is provided in the center of the carrier (9) radially inside the planetary rollers (10),
    (e) the grooves (11) of the planetary rollers (10) and the grooves (12) of the bearing body (7) have a mutually adapted gradient,
    (f) the planetary rollers (10) and the bearing body (7) are geared with one another ensuring freedom from slip via a toothed region (14),
    (g) the carrier (9) and the bearing body (7) are driven in rotational relationship, ensuring freedom from slip between the planetary rollers (10) and the sliding body (5) whereby the carrier (9) and the bearing body (7) are driven by a common drive shaft (8), and
    (h) the drive shaft (8) has a region acting as a sun wheel and the drive shaft (8) drives the carrier (9) with a planetary toothed gearing having planetary toothed wheels (18) in a hollow toothed wheel (19) fixed relative to the drive shaft (8).

2. The device as claimed in claim 1, wherein the drive shaft (8) is connected integrally to the bearing body (7).

3. The device as claimed in claim 1, wherein the drive shaft (8) is a continuously hollow together with the bearing body (7) in a longitudinal direction.

4. The device as claimed in claim 1,
wherein an electrical hollow-shaft motor (20), fitted inside the central cavity of drive shaft (8) and the bearing body (7), whose rotor (22) drives the drive shaft (8), wherein the electrical hollow shaft motor is drive motor for the drive shaft.

5. The device as claimed in claim 1, which is
a drive of a width-adjustable pulley (2) of an infinitely variably adjustable belt transmission.

6. The device as claimed in claim 5,
wherein a stator (21) of the hollow shaft motor (20) is connected solidly to the pulley shaft (3) of the pulley.

7. The device as claimed in claim 6, wherein
the pulley shaft (3) penetrates the cavity of the drive shaft (8) as well as of the bearing body (7),
the rotor (22) of the hollow shaft motor (20) is rotationally mounted on the pulley shaft (3),
the sliding body (5) is connected integrally to a width-adjustable region (4) of the pulley (2) mounted to shift longitudinally on the pulley shaft (3),
a supporting member (6) connected integrally to the pulley shaft (3) serves as counterbearing for the drive shaft (8) with the bearing body (7); the planetary rollers-carrier (9) with the planetary rollers (10) threadably engaged in the sliding body (5) and bearing body (7).

8. The device as claimed in claim 1,
which is an adjustable drive for use in an injection moulding machine.

* * * * *